J. LOCKE.
Collimating Level.
No. 7,477.
Patented July 2, 1850.
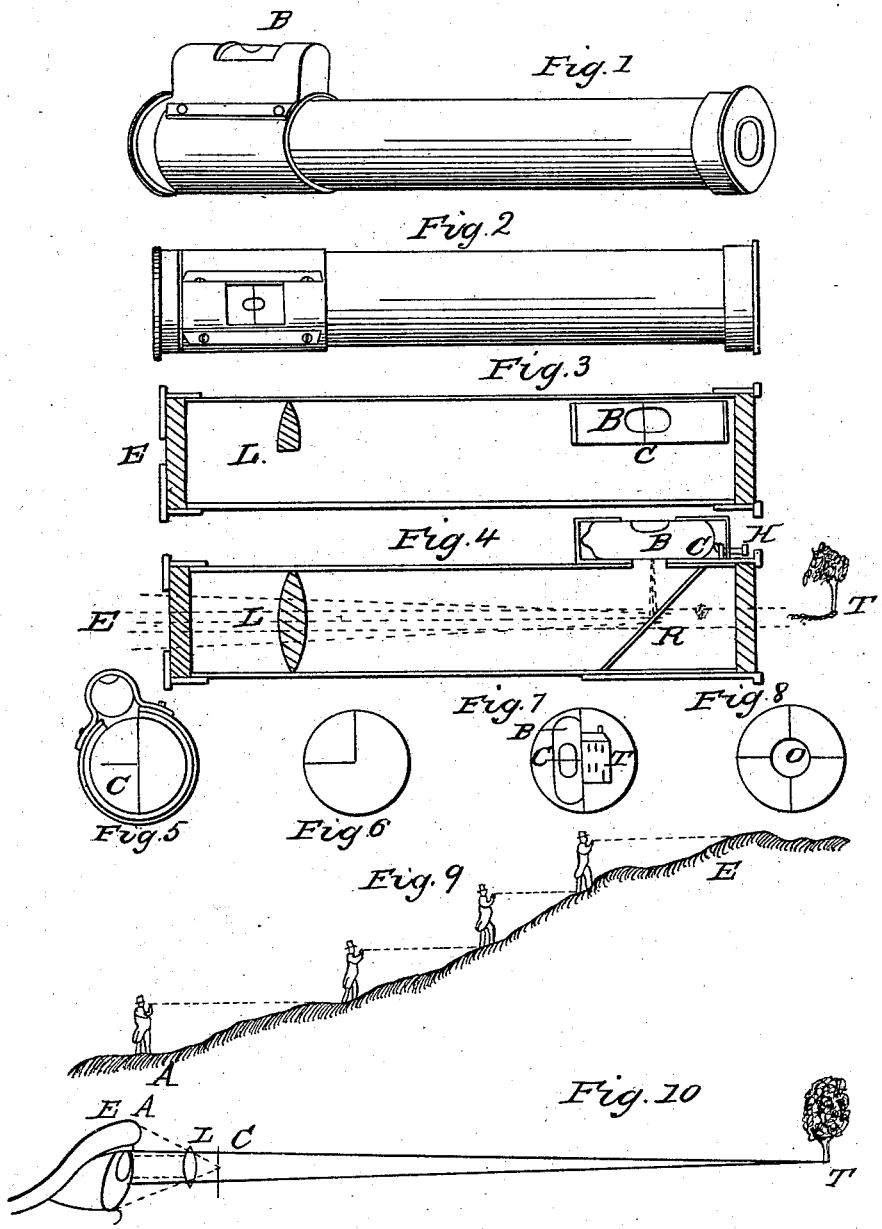

UNITED STATES PATENT OFFICE.

JOHN LOCKE, OF CINCINNATI, OHIO.

COLLIMATING LEVEL.

Specification of Letters Patent No. 7,477, dated July 2, 1850.

*To all whom it may concern:*

Be it known that I, JOHN LOCKE, of Cincinnati, in the county of Hamilton and the State of Ohio, have invented a new Portable or Hand Level; and I do hereby declare that the following is a full and exact description thereof, in which—

Figure 1 is a perspective view of the whole instrument, of full size, and in its true position, as when in use; Fig. 2 is a top view of the same; Fig. 3, a horizontal section as regards the lens L and the tube; B, being the spirit level. Fig. 4, is a vertical section in which L is the lens; R a reflector; B, the spirit level; H, a screw for adjustment. The dotted lines divergent a little from C to the reflector, R, thence divergent again from R, to L; and thence again parallel to the eye, represent the rays of light coming from the cross wire C under B, seen in Fig. 4, by a view slightly underneath the bubble, B, and more distinctly in the top view, Fig. 3, where it crosses and bisects the bubble. The long continuous lines extending from the tree T through R and L to the eye at E represent the rays from a distant object. The tree or distant object must be imagined to be very distant, when the rays from R to E may be considered to be parallel as represented. The dotted lines from the cross wire must be supposed to strike the reflector close to its edge and to pass through the lens L near to its cut edge, while the continuous lines representing rays from the distant object (the root of the tree), are supposed barely to escape the reflector and the lens. Hence the light from the cross wire, and from the distant object, comes in continuously and near the middle longitudinal vertical plane of the instrument. Fig. 5 is a transverse section through the spirit level showing its situation when in use and the manner in which it is attached; Fig. 6, shows a lens one fourth of which has been removed. Fig. 7 is the appearance in the field of view showing the manner in which the bubble of the spirit level and the cross wire are reflected in visual contact with the object in level, (the middle of a house); Fig. 8, shows a perforated lens which may be used instead of the half lens at first proposed, Fig. 9, shows the manner in which the observer finds the height of a hill, by using the height of his own person to the eyes, instead of the target rod, Fig. 10 shows the optical principle on which the instrument is constructed in which T is the distant object from which the course of two rays is represented by continuous lines, diverging slightly to the two extremes of the sight of the eye (pupil) at E; c, represents the cross wire from a point of which rays diverge toward E and so extremely divergent are they, the point being so near to the eye, that it would be invisible, but by the interposition of the lens, L having C in its focus those divergent rays are made to emerge parallel, and enter the pupil of the eye parallel, along with the rays from T, their course being shown by the dotted lines just inside of the lines from T, along the figure from L to E. It will be seen that this figure is the illustration of the principle of the single lens microscope with the introduction of the rays from the distant object superseded.

The instrument may be considered a microscopic view of the cross wire and the bubble, with one part of the microscope field cut away for the introduction of a contiguous view of a distant immagnified object. As the rays of light from the cross wire, C, enter the eye parallel to each other that cross wire will appear at a great distance, because an object must ordinarily be at such distance to send its rays thus parallel to the eye. In as much as these rays coincide with those from the distant object, T, that cross wire must appear at the same distance and in contact with that distant object. Optically then the cross wire and the bubble are in contact with the distant object and hence there can be no parallax, or seeing obliquely through between the cross wire C and the object T by moving the head from side to side. And again as the two are seen optically at a great distance both the sight mark or cross wire C, and the distant object, T, can be seen with ease and distinctness. In this manner the two optical difficulties of naked sights, hereafter named, are overcome.

Special object of the arrangement shown in the drawings: In ranging plain sights, consisting of two points near the eye, ranged to a third point at a distance an optical difficulty is encountered, which arises from the inability of the eye to adjust itself in such a manner that both the near objects and the distant ones shall be seen clearly at the same moment, one or the other, it is known, by experience, will appear as a confused blur with no definite outline. Another optical difficulty is that although the three points may be actually in a line, yet if the eye be moved in the least out of that line a parallax is involved which causes the several objects, intended to be ranged to, appear to be more or less separated. The general design of the invention of the hand level, the improved compass sight and the improved gun sight is to overcome both of these difficulties. In order to understand the optical principle essential in the invention it is important that there should be kept in mind the optical law that the eye has no power to be affected by light, otherwise than it is last received by that organ; and that the mind is always impressed with the idea that there is an object in such direction and distance as would produce the existing picture in the eye by rectilinear pencils of light, the eye taking no cognizance of either refractions or reflections to which the light may have been subjected previous to its entering that organ.

The right hand end of Fig. 1 is the eye end of the instrument. It is closed by a plain glass covered with a brass cap having rather a large aperture. The opposite or left hand end of the same figure is closed with a plain glass, capped with brass having the largest aperture which the tube admits; these glasses at each end being intended merely for protection and performing no optical purpose. The right hand half of the tube, divided by a vertical plane running longitudinally, is entirely clear and permits the observer to look through it at distant objects which appear without being magnified. The left hand half includes the half of a convex lens, as at L Fig. 3; and further from the eye at R, a looking glass reflector placed at an angle of 45°, but extending in width only half way across the tube. Over this reflector is placed the spirit level, as at B, the tube being cut away between the level and the reflector, as beneath B in the figure. The cross wire, c, which is placed transversely under and across the tube, under B, must be exactly in the principal focus of the lens L. It is obvious that on looking into the tube, the diagonal reflector R, Fig. 4 will cause the spirit level, the cross wire, and the bubble to appear in the vertical position as in Fig. 7, and that when the spirit level is leveled the bubble will be in the middle and will stand bisected by the cross wire, c, as seen in Fig. 7 where the line, c, from left to right is intended to represent the cross wire. When the bubble, B, is thus bisected by the cross wire c, the object seen in visual contact with the end of that wire (as a point on the house in the figure between the upper and lower tier of windows) is on a level with the eyes. Thus by holding the tube in the hand like a pistol, and raising or lowering it, as if to aim at an object, until the bubble is bisected, the level point or horizon is at once seen. Although it can be thus conveniently used by hand yet it is evident it can be mounted and used as an ordinary level upon a stand.

Construction: To enable persons skilled in the manufacture of optical instruments to make this instrument, it is only necessary to observe that by inspecting the figures, it will be seen that the construction is in general the same as that of small telescopes and levels. A convenient way of fastening the diagonal reflector, R, is to send the main tube half through at the proper angle, introduce a thin piece of looking glass, ground to a semioval outline, into this sawed slit, and fit on a thin short piece of brass tube over this cut tube including the reflector the outer circumference of which must be ground to fit the outer circumference of the main tube and must coincide with it. On this outer tube again plant the flanged cell of the spirit bubble passing the screws through the three, as shown in section, Fig. 5. The semilens may be set in a short interior sliding tube, not shown in the figures, adjustable to the point of no parallax. The cell for the spirit level tube must be open above, as in Fig. 1, B, and below, as in Fig. 4, B. The cross wire, c, is borne on a little rectangular frame underneath the bubble tube adjustable by a screw the head of which is seen at H, Fig. 4. By means of this screw the instrument is adjustable by any of the usual modes of adjusting levels. The instrument thus made can be carried in the waistcoat pocket, or what is better in a special pocket with a ring to attach a guard chain passing round the neck.

Method of using the instrument to ascertain absolute altitudes, without a target rod as shown in Fig. 9: The observer ranges forward to some visible mark, as a stone, a stick or the like, he then advances to this mark and standing on it, repeats the same operation with regard to a second object, keeping tally, and finally multiplying his own height from his feet to his eye say 5 feet, 5 inches, by this talley when the product shall be the altitude. On a descending slope the observer leaves a mark and descends until by trial that mark is hit by back sighting. Such back sights are of course negative as regards altitude. If the observer have a pedometer or count his steps he may thus note a profile of surface almost as fast as he can walk. The cross wire c, being in the focus of the lens L, Fig. 4. The instrument is a true collimater, and the cross wire is seen optically at an infinite distance, because the rays from it emerge to the eye parallel to each other, as if from a distant object, as is shown by the parallel dotted lines from L to E in Fig. 10, and from L to E in Fig. 4.

To adjust the lens L to its place of no parallax, fix the instrument as by holding it firmly against a post or a tree there being two points of bearing and looking at the coincidence of the cross wire image with any visible distant object move the eye as much as the opening at the eye end will permit. If the lens, L, be in adjustment, the cross wire image will have no apparent motion on the object; if it have any motion slide the tube bearing the lens in or out until that motion disappears and the cross wire image clings to the object as if it were a part of it. In this condition the instrument is said to be clear of parallax. It will be seen that the principle on which this instrument is constructed is nearly the same as that on which depend the peculiarities of the improved compass sight for which application has lately been made by me, both being an application of what is called technically collimation. In both instruments the application of optical collimation may be considered equivalent to a split field of a microscope. The cross wire being seen in one part of the field microscopically and in optical contact with a distant object viewed without a magnifying medium through the other part of the divided field.

What I claim and wish to secure by Letters Patent is—

The mode substantially as herein described of forming a levelling instrument by combining the spirit level with the collimator having a partial lens, viz: by means of a partial reflector so placed as to reflect both the cross wire and the spirit level bubble in such manner that the image of the latter may be seen bisected by the image of the former when the instrument is horizontal, the image of the cross wire being at the same time seen in optical contact with the distant point which marks the level with the observer's eye.

JOHN LOCKE.

Witnesses:
  JOHN LOCKE, jr.,
  JAMES LOCKE.